(12) United States Patent
Miles

(10) Patent No.: US 7,138,984 B1
(45) Date of Patent: *Nov. 21, 2006

(54) DIRECTLY LAMINATED TOUCH SENSITIVE SCREEN

(75) Inventor: Mark W. Miles, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 09/875,401

(22) Filed: Jun. 5, 2001

(51) Int. Cl.
 *G09G 5/00* (2006.01)
(52) U.S. Cl. .................. 345/173; 178/18.01; 359/291
(58) Field of Classification Search ........ 345/173–178, 345/179, 84, 85; 359/291, 247, 579, 584, 359/549; 178/18.01, 18.03; 187/18.01–18.03
See application file for complete search history.

(56) References Cited

U.S. PATENT DOCUMENTS

| | | | |
|---|---|---|---|
| 2,534,846 A | 12/1950 | Ambrose et al. |
| 3,184,600 A | 5/1965 | Potter |
| 3,371,345 A | 2/1968 | Lewis |
| 3,410,363 A | 11/1968 | Schwartz |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,746,785 A | 7/1973 | Te Velde |
| 3,813,265 A | 5/1974 | Marks |
| 3,955,880 A | 5/1976 | Lierke |
| 4,099,854 A | 7/1978 | Decker et al. |
| 4,228,437 A | 10/1980 | Shelton |
| 4,347,983 A | 9/1982 | Bodai |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | Te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |

(Continued)

FOREIGN PATENT DOCUMENTS

EP    0261897 A2    3/1988

(Continued)

OTHER PUBLICATIONS

Pacheco et al. "Design of Low Actuation Voltage RF MEMS Switch" Radiation Laboratory and Center for Microsystems Department of Electrical Engineering and Computer Science University of Michigan, IEEE (2000) 0-7803-5687-X/00/.

(Continued)

*Primary Examiner*—Richard Hjerpe
*Assistant Examiner*—Jennifer T. Nguyen
(74) *Attorney, Agent, or Firm*—Knobbe, Martens, Olson & Bear, LLP

(57) ABSTRACT

A touch screen display having a touch screen directly coupled to a display is described herein. The display may be an interferometric modular display. The touch screen may be directly laminated to a glass substrate in the display, or the touch screen may be directly laminated to a diffuser film in the display. Alternatively, the display can be any type of display that is not sensitive to pressure.

8 Claims, 6 Drawing Sheets

U.S. PATENT DOCUMENTS

| | | |
|---|---|---|
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,900,136 A | 2/1990 | Goldburt et al. |
| 4,900,395 A | 2/1990 | Syverson et al. |
| 4,954,789 A | 9/1990 | Sampsell |
| 4,956,619 A | 9/1990 | Hornbeck |
| 4,965,562 A | 10/1990 | Verhulst |
| 4,977,009 A | 12/1990 | Anderson et al. ............. 429/76 |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,126,836 A | 6/1992 | Um |
| 5,142,405 A | 8/1992 | Hornbeck |
| 5,142,414 A | 8/1992 | Koehler |
| 5,148,157 A | 9/1992 | Florence |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,185,660 A | 2/1993 | Um |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores ........................ 428/76 |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,304,419 A | 4/1994 | Shores ........................ 428/355 |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,353,114 A | 10/1994 | Hansen |
| 5,358,601 A | 10/1994 | Cathey |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,450,205 A | 9/1995 | Sawin et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,580,144 A | 12/1996 | Stroomer |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores ........................ 252/194 |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,636,052 A | 6/1997 | Arney et al. |
| 5,636,185 A | 6/1997 | Brewer et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,683,591 A | 11/1997 | Offenberg |
| 5,699,074 A | 12/1997 | Sutherland et al. |

| | | | | | | |
|---|---|---|---|---|---|---|
| 5,703,710 | A | 12/1997 | Brinkman et al. | 6,741,384 B1 | 5/2004 | Martin et al. |
| 5,710,656 | A | 1/1998 | Goossen | 6,741,503 B1 | 5/2004 | Farris et al. |
| 5,726,480 | A | 3/1998 | Pister | 6,747,785 B1 | 6/2004 | Chen et al. |
| 5,739,945 | A | 4/1998 | Tayebati | 6,747,800 B1 | 6/2004 | Lin |
| 5,745,193 | A | 4/1998 | Urbanus et al. | 6,762,873 B1 | 7/2004 | Coker et al. |
| 5,745,281 | A | 4/1998 | Yi et al. | 6,775,174 B1 | 8/2004 | Huffman et al. |
| 5,771,116 | A | 6/1998 | Miller et al. | 6,778,155 B1 | 8/2004 | Doherty et al. |
| 5,784,190 | A | 7/1998 | Worley | 6,794,119 B1 | 9/2004 | Miles |
| 5,784,212 | A | 7/1998 | Hornbeck | 6,811,267 B1 | 11/2004 | Allen et al. |
| 5,793,504 | A | 8/1998 | Stoll | 6,819,469 B1 | 11/2004 | Koba |
| 5,808,780 | A | 9/1998 | McDonald | 6,822,628 B1 | 11/2004 | Dunphy et al. |
| 5,815,141 | A | 9/1998 | Phares ......... 345/173 | 6,829,132 B1 | 12/2004 | Martin et al. |
| 5,818,095 | A | 10/1998 | Sampsell | 6,853,129 B1 | 2/2005 | Cummings et al. |
| 5,825,528 | A | 10/1998 | Goossen | 6,855,610 B1 | 2/2005 | Tung et al. |
| 5,835,255 | A | 11/1998 | Miles ......... 359/291 | 6,859,218 B1 | 2/2005 | Luman et al. |
| 5,842,088 | A | 11/1998 | Thompson | 6,861,277 B1 | 3/2005 | Monroe et al. |
| 5,912,758 | A | 6/1999 | Knipe et al. | 6,862,022 B1 | 3/2005 | Slupe |
| 5,943,158 | A | 8/1999 | Ford et al. | 6,862,029 B1 | 3/2005 | D'Souza et al. |
| 5,945,980 | A * | 8/1999 | Moissev et al. ......... 345/170 | 6,867,896 B1 | 3/2005 | Miles |
| 5,986,796 | A | 11/1999 | Miles ......... 359/260 | 6,870,581 B1 | 3/2005 | Li et al. |
| 6,028,690 | A | 2/2000 | Carter et al. | 6,870,654 B1 | 3/2005 | Lin et al. |
| 6,038,056 | A | 3/2000 | Florence et al. | 6,882,458 B1 | 4/2005 | Lin et al. |
| 6,040,937 | A | 3/2000 | Miles ......... 359/291 | 6,882,461 B1 | 4/2005 | Tsai et al. |
| 6,049,317 | A | 4/2000 | Thompson et al. | 6,912,022 B1 | 6/2005 | Lin et al. |
| 6,055,090 | A * | 4/2000 | Miles ......... 359/291 | 6,952,303 B1 | 10/2005 | Lin et al. |
| 6,061,075 | A | 5/2000 | Nelson et al. | 6,958,847 B1 | 10/2005 | Lin |
| 6,099,132 | A | 8/2000 | Kaeriyama | 2001/0003487 A1 | 6/2001 | Miles |
| 6,100,872 | A | 8/2000 | Aratani et al. | 2001/0050666 A1 | 12/2001 | Huang et al. |
| 6,113,239 | A | 9/2000 | Sampsell et al. | 2002/0012159 A1 | 1/2002 | Tew |
| 6,147,790 | A | 11/2000 | Meier et al. | 2002/0015215 A1 | 2/2002 | Miles |
| 6,160,833 | A | 12/2000 | Floyd et al. | 2002/0024711 A1 | 2/2002 | Miles |
| 6,180,428 | B1 | 1/2001 | Peeters et al. | 2002/0041264 A1 | 4/2002 | Quanrud |
| 6,201,633 | B1 | 3/2001 | Peeters et al. | 2002/0054424 A1 | 5/2002 | Miles |
| 6,222,511 | B1 | 4/2001 | Stoller et al. | 2002/0075555 A1 | 6/2002 | Miles |
| 6,232,936 | B1 | 5/2001 | Gove et al. | 2002/0126364 A1* | 9/2002 | Miles |
| 6,242,989 | B1 | 6/2001 | Barber et al. | 2002/0149828 A1 | 10/2002 | Miles |
| 6,243,149 | B1 | 6/2001 | Swanson et al. | 2002/0171610 A1* | 11/2002 | Siwinski et al. |
| 6,275,220 | B1* | 8/2001 | Nitta ......... 345/204 | 2002/0175284 A1 | 11/2002 | Vilain |
| 6,282,010 | B1 | 8/2001 | Sulzbach et al. | 2002/0181208 A1* | 12/2002 | Credelle et al. |
| 6,295,154 | B1 | 9/2001 | Laor et al. | 2002/0186209 A1* | 12/2002 | Cok |
| 6,304,297 | B1 | 10/2001 | Swan | 2003/0004272 A1 | 1/2003 | Power |
| 6,323,982 | B1 | 11/2001 | Hornbeck | 2003/0043157 A1 | 3/2003 | Miles |
| 6,339,417 | B1 | 1/2002 | Quanrud | 2003/0072070 A1 | 4/2003 | Miles |
| 6,395,863 | B1* | 5/2002 | Geaghan ......... 528/196 | 2003/0107805 A1 | 6/2003 | Street |
| 6,424,094 | B1* | 7/2002 | Feldman ......... 315/169.3 | 2003/0122773 A1 | 7/2003 | Washio |
| 6,447,126 | B1 | 9/2002 | Hornbeck | 2003/0128197 A1 | 7/2003 | Turner et al. |
| 6,465,355 | B1 | 10/2002 | Horsley | 2003/0141453 A1 | 7/2003 | Reed et al. |
| 6,466,354 | B1* | 10/2002 | Gudeman ......... 359/247 | 2003/0173504 A1 | 9/2003 | Cole et al. |
| 6,466,358 | B1 | 10/2002 | Tew | 2003/0202264 A1 | 10/2003 | Weber et al. |
| 6,473,072 | B1* | 10/2002 | Comiskey et al. ......... 345/173 | 2003/0202265 A1 | 10/2003 | Reboa et al. |
| 6,473,274 | B1 | 10/2002 | Maimone et al. | 2003/0202266 A1 | 10/2003 | Ring et al. |
| 6,480,177 | B1 | 11/2002 | Doherty et al. | 2004/0051929 A1 | 3/2004 | Sampsell et al. |
| 6,496,122 | B1 | 12/2002 | Sampsell | 2004/0058532 A1 | 3/2004 | Miles et al. |
| 6,545,335 | B1 | 4/2003 | Chua et al. | 2004/0080807 A1 | 4/2004 | Chen et al. |
| 6,548,908 | B1 | 4/2003 | Chua et al. | 2004/0125281 A1 | 7/2004 | Lin et al. |
| 6,549,195 | B1* | 4/2003 | Hikida et al. ......... 345/173 | 2004/0145049 A1 | 7/2004 | McKinnell et al. |
| 6,549,338 | B1 | 4/2003 | Wolverton et al. | 2004/0145811 A1 | 7/2004 | Lin et al. |
| 6,552,840 | B1 | 4/2003 | Knipe | 2004/0147056 A1 | 7/2004 | McKinnell et al. |
| 6,574,033 | B1 | 6/2003 | Chui et al. | 2004/0147198 A1 | 7/2004 | Lin et al. |
| 6,589,625 | B1 | 7/2003 | Kothari et al. | 2004/0150939 A1 | 8/2004 | Huff |
| 6,600,201 | B1 | 7/2003 | Hartwell et al. | 2004/0160143 A1 | 8/2004 | Shreeve et al. |
| 6,606,175 | B1 | 8/2003 | Sampsell et al. | 2004/0174583 A1 | 9/2004 | Chen et al. |
| 6,625,047 | B1 | 9/2003 | Coleman, Jr. | 2004/0175577 A1 | 9/2004 | Lin et al. |
| 6,630,786 | B1 | 10/2003 | Cummings et al. | 2004/0179281 A1 | 9/2004 | Reboa |
| 6,632,698 | B1 | 10/2003 | Ives | 2004/0207897 A1 | 10/2004 | Lin |
| 6,643,069 | B1 | 11/2003 | Dewald | 2004/0209192 A1 | 10/2004 | Lin et al. |
| 6,650,455 | B1 | 11/2003 | Miles | 2004/0209195 A1 | 10/2004 | Lin |
| 6,666,561 | B1 | 12/2003 | Blakley | 2004/0212026 A1 | 10/2004 | Van Brocklin et al. |
| 6,674,090 | B1 | 1/2004 | Chua et al. | 2004/0217378 A1 | 11/2004 | Martin et al. |
| 6,674,562 | B1 | 1/2004 | Miles et al. | 2004/0217919 A1 | 11/2004 | Pichl et al. |
| 6,680,792 | B1* | 1/2004 | Miles ......... 359/291 | 2004/0218251 A1 | 11/2004 | Piehl et al. |
| 6,710,908 | B1 | 3/2004 | Miles et al. | 2004/0218334 A1 | 11/2004 | Martin et al. |
| 6,741,377 | B1 | 5/2004 | Miles | 2004/0218341 A1 | 11/2004 | Martin et al. |

| | | |
|---|---|---|
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0017177 A1 | 1/2005 | Tai et al. |
| 2005/0017942 A1 | 1/2005 | Tsujino et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelman |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0168849 A1 | 8/2005 | Lin |
| 2005/0195462 A1 | 9/2005 | Lin |
| 2005/0202649 A1 | 9/2005 | Hung et al. |

FOREIGN PATENT DOCUMENTS

| | | |
|---|---|---|
| EP | 0608056 A1 | 7/1994 |
| EP | 0667548 | 8/1995 |
| EP | 0986077 A2 | 3/2000 |
| EP | 1067805 A2 | 1/2001 |
| JP | 3109524 A | 5/1991 |
| JP | 405275401 | 10/1993 |
| JP | 1016130 A | 6/1998 |
| RO | 157313 | 5/1991 |
| WO | WO 94/029840 A1 | 12/1994 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO 02/063602 A1 | 8/2002 |
| WO | WO03007049 A1 | 1/2003 |
| WO | WO 03/069413 A1 | 8/2003 |
| WO | WO 03/073151 | 9/2003 |
| WO | WO 04/006003 A1 | 1/2004 |
| WO | WO 04/026757 A2 | 4/2004 |
| WO | WO 04/075526 A2 | 9/2004 |

OTHER PUBLICATIONS

Vähä-Heikkilä et al. "Design of Capacitive RF MEMS Power Sensor" VTT Information Technology, (2002), available at <http://www.hut.fi/Units/Radio/URSI02/ursi_vaha-heikkila.pdf>.

Akasaka, "Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Billard, C.; "Tunable Capacitor," 5h Annual Review of LET1, Jun. 24, 2003, p. 7.

Bouchaud, Jeremie; Wicht, Henning; "RF MEMES Analysis, Forecasts and Technology Review," Chip Unaxis, date unknown, [online] retrieved from the internet: <URL:http://semiconductors.unaxis.com/en/download/RF%20MEMS.pdf>.

Chan et al., "Low-Actuation Voltage RF MEMS Shunt Switch With Cold Switching Lifetime of Seven Billion Cycles," Journal of Microelectromechanical Systems vol. 12, No. 5 (Oct. 2003).

Connor, "Hybrid Color Display Using Optical Interference Filter Array," SID Digest, pp. 577-580 (1993).

De Coster et al., "Variable RF MEMS Capacitors With Extended Tuning Range", IEEE International Solid-State Sensors and Actuators Conference, Boston, (Jun. 8-12, 2003).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).

Gosch, "West Germany Grabs the Lead in X-Ray Lithography," Electronics, pp. 78-80 (Feb. 5, 1987).

Heines et al., "Bi-Stable Flat-Panel Display Based On A 180 [DEG.] Flipping Pixel", Conference: Displays IX: Displays for Defense Applications, (Apr. 2-5, 2002), Proceedings of the SPIE: The International Society for Optical Engineering, vol. 4712, pp. 327-335.

Howard et al., "Nanometer-Scale Fabrication Techniques," VLSI Electronics: Microstructures Science, vol. 5, pp. 145-153 and pp. 166-173 (1982).

Jackson, "Classical Electrodynamics," John Wiley & Sons Inc., pp. 568-573, date unknown.

Jerman et al., "A Miniature Fabry-Perot Interferometer with a Corrugated Silicon Diaphragm Support," IEEE Electron Devices Society (1988).

Johnson "Optical Scanners," Microwave Scanning Antennas, vol. 1, pp. 251-261 (1964).

Li, G.P. "On the design and Fabrication of Electrostatic RF MEMS Switches," Final Report 1999-00 for MICRO Project 99-071, University of California, Irvine.

Light over Matter, Circle No. 36 (Jun. 1993).

Mait, "Design of Diffractive Optical Elements for Optical Signal Processing", IEEE Lasers and Electro-Optics Society Annual Meeting, pp. 59-60, (Nov. 15-18, 1993).

Miles, "A New Reflective FPD Technology Using Interferometric Modulation," Society for Information Display '97 Digest, Session 7.3.

Newsbreaks, "Quantum-trench devices might operate at terahertz frequencies," Laser Focus World (May 1993).

Nieminen, Heikki, Ermolov, Vladimir; Silanto, Samuli; Nybergh, Kjell; Rhanen, Tapani; "Design of a Temperature-Stable RF MEM Capacitor," Institute of Electrical and Electronics Engineers (IEEE) Journal of Microelectromechanical Systems, vol. 13, No. 5, Oct. 2004, pp. 705-714.

Oliner et al., "Radiating Elements and Mutual Coupling," Microwave Scanning Antennas, vol. 2, pp. 131-194 (1966).

Oz et al., "CMOS-Compatible RF-MEMS Tunable Capactiors", IEEE MTT-S International Microwave Symposium-IMS 2003, (Jun. 8-13, 2003).

Raley et al., "A Fabry-Perot Microinterferometer for Visible Wavelengths," IEEE Solid-State Sensor and Actuator Workshop, Hilton Head, SC (1992).

Solgaard et al., "Interference-Based Optical Mems Filters", Optical 2004 Fiber Communication Conference, vol. 1, (Feb. 23-27, 2004).

Sperger et al., "High Performance Patterned All-Dielectric Interference Colour Filter for Display Applications," SID Digest, pp. 81-83 (1994).

Stone, "Radiation and Optics, An Introduction to the Classical Theory," McGraw-Hill, pp. 340-343 (1963).

Tan et al. "RF MEMS Simulation-High Isolation CPW Shunt Switches", Ansoft: Global Seminars: Delivering Performance (2003).

Walker, et al., "Electron-beam-tunable Interference Filter Spatial Light Modulator," Optics Letters vol. 13, No. 5, pp. 345-347 (May 1988).

Wang et al., "Design and Fabrication of A Novel Two-Dimensional Mems-Based Tunable Capacitor", IEEE 2002 International Conference on Communications, Circuits and Systems and West Sino Expositions, vol. 2, pp. 1766-1769, (Jun. 29-Jul. 1, 2002).

Winton, John M., "A Novel way to capture solar energy," Chemical Week, pp. 17-18 (May 15, 1985).

Wu, "Design of a Reflective Color LCD Using Optical Interference Reflectors," ASIA Display '95, pp. 929-931 (Oct. 16, 1995).

Bass, "Handbook of Optics, vol. 1, Fundamentals, Techniques, and Design, Second Edition," McGraw-Hill, Inc., New York, pp. 2.29-2.36 (1995).

Ibotson, et al. "Comparison of XeF2, and F-atom reactions with Si and Si02, Applied Physics Letters." vol. 44, No. 12, Jun. 1984. pp. 1129-1131.

Schnakenberg, et al. "THAHW Etchants for Silicon Micromachining." 1991 International Conference on Solid State Sensors and Actuators-Digest of Technical Papers. pp. 815-818.

Williams, et al. Etch Rates for Michromachining Processing-Journal of Microelectromechanical Systems. vol. 5 No. 4, Dec. 1996, pp. 256-269.

Winters, et al., "The Etching of Silicon with XeF2 Vapor." Applied Physics Letters, vol. 34. No. 1, Jan. 1979, pp. 70-73.

Austrian Search Report from Patent Application No. 11/097509, Jul. 14, 2005.

Austrian Search Report from Patent Application No. 11/097509, Jul. 29, 2005.

Austrian Search Report from Patent Application No. 11/096546, May 19, 2005.

Austrian Search Report from Patent Application No. 11/140560, Aug. 11, 2005.

Austrian Search Report from Patent Application No. 11/066724, May 13, 2005.

Austrian Search Report from Patent Application No. 11/097,818, Jul. 14, 2005.

Austrian Search Report from Patent Application No. 11/097,820, Jun. 29, 2005.

* cited by examiner

DIRECTLY LAMINATED TOUCH SENSITIVE SCREEN

FIELD OF THE INVENTION

This invention relates generally to touch screen displays, and more particularly to a touch screen directly laminated to a display.

BACKGROUND OF THE INVENTION

A touch screen is a user interface that covers a display and enables a user to operate a device simply by touching various locations on the touch screen. The touch screen is clear, so the user can view the display through the touch screen. The display shows information that enables a user to control the device by touching various locations on the touch screen. For example, the display may show various buttons that are associated with certain commands. When the user touches an area on the touch screen over the button, the device executes the command associated with that button. The device typically includes custom applications that enable the device to receive inputs from the touch screen. The touch screen may be sensitive to the touch of a finger, stylus, or other pointing device.

Touch screens typically include a laminate of at least two films with conducting internal surfaces and an array of spacers. Pressure on a surface of the touch screen decreases the resistance of the laminate at the point of pressure, thereby enabling the electronic detection of the location of the point of pressure. Thus, the location of a finger or stylus being used to touch the screen can be determined.

A touch screen may be used with display for a personal computer, such as a cathode ray tube (CRT) monitor. Additionally, a touch screen may be used with a portable device such as a laptop computer or a personal digital assistant (PDA). Laptop computers and PDAs typically utilize liquid crystal displays. Newer types of displays that may be used with PDAs and other portable electronic devices include organic light emitting diodes (OLEDs) and electronic ink.

LCDs require that a fixed amount of space be maintained between two glass plates that surround the shell of the liquid crystal. If pressure is applied to either of these plates, the image displayed on the LCD may be distorted. This phenomenon is typically referred to as bruising. Distortion of the image displayed on the LCD is detected around the area where pressure is applied. If sufficient pressure is applied to either of the glass plates, permanent damage to the cell may occur.

Because touch screens typically require an applied pressure to determine the location of a pointing device, and because LCDs are sensitive to applied pressure, a touch screen that is used with an LCD must be mounted on a separate piece of glass that is suspended some distance from the LCD. FIG. 1 illustrates a touch screen display 100 including a touch screen 102 suspended above an LCD 104 according to the prior art. Touch screen 102 includes a glass substrate 106, to which a touch screen system 108 is attached. Glass substrate 106 provides rigidity to touch screen 102. Touch screen system 108 may be laminated to the surface of glass substrate 106. LCD 104 includes a first glass plate 110 and a second glass plate 112. A liquid crystal display element 114 is located between first glass plate 110 and second glass plate 112.

Since liquid crystal display element 112 is sensitive to pressure, an air gap 114 must be maintained between touch screen 100 and LCD 102. Glass substrate 106 prevents touch screen 102 from coming into contact with LCD 104 when pressure is applied to touch screen system 108. However, the presence of glass substrate 104 and air gap 114 results in increased weight and bulk of the device on which the display is used. Furthermore, glass substrate 104 may reduce optical performance due to increased reflections from internal surfaces.

SUMMARY OF THE INVENTION

A touch screen display having a touch screen directly coupled to a display is described herein. According to one embodiment of the present invention, the touch screen is laminated directly to the display. The display may be an interferometric modular display. Alternatively, the display can be any type of display that is not sensitive to pressure.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION OF THE INVENTION

In the following detailed description of embodiments of the invention, numerous specific details are set forth such as examples of specific materials, machines, and methods in order to provide a thorough understanding of the present invention. It will be apparent, however, to one skilled in the art that these specific details need not be employed to practice the present invention. In other instances, well known materials, machines, or methods have not been described in detail in order to avoid unnecessarily obscuring the present invention.

A touch screen coupled directly to a display is described herein. The display may be an interferometric modulator display (iMoD). Alternatively, the display may be a light emitting polymer (LEP) display, an organic light emitting diode display (OLED), an electronic ink display, or any other type of display that is not sensitive to pressure. The touch screen may be mounted or laminated directly to a glass plate on the display.

Figure 1:
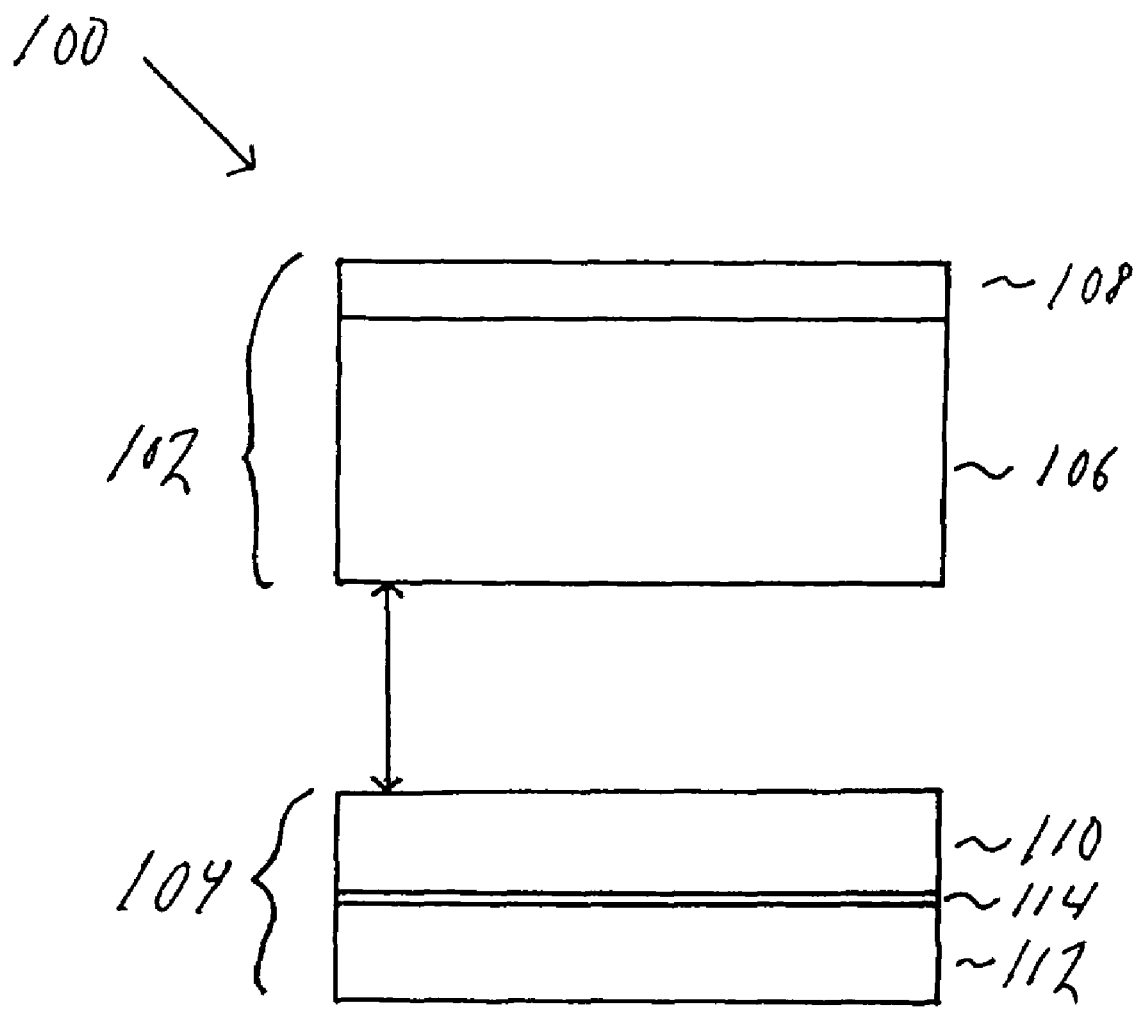
FIG. 1 illustrates a touch screen display including a touch screen suspended above an LCD according to the prior art.
Figure 2:
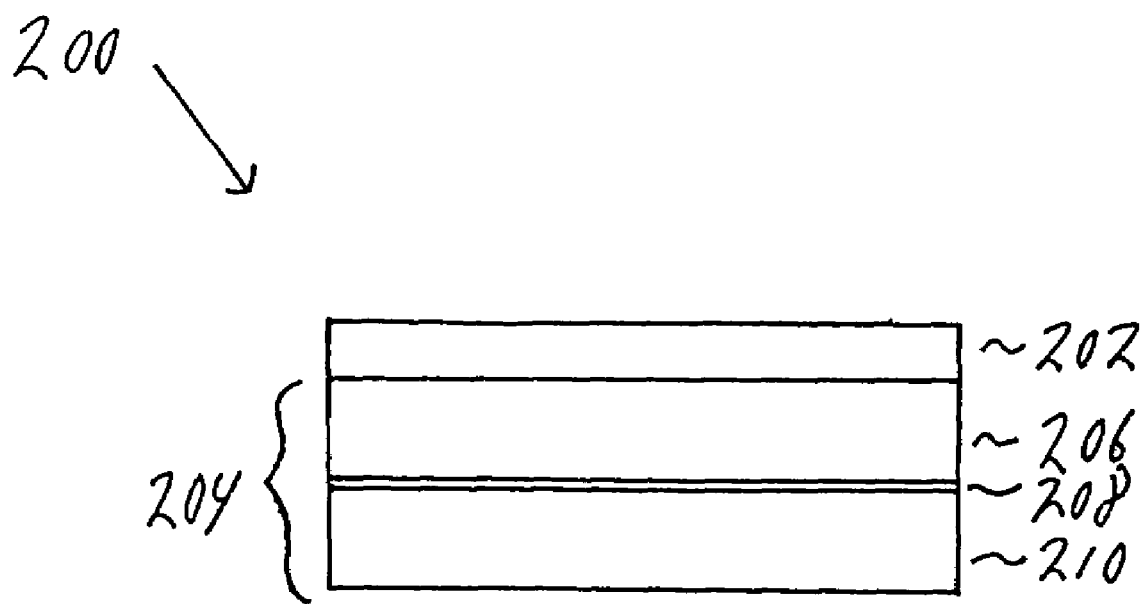
FIG. 2 illustrates one embodiment of a touch screen display including a touch screen directly laminated to a display.

FIG. 2 illustrates one embodiment of a touch screen display 200 including a touch screen 202 directly laminated to a display 204. Touch screen 202 is mounted or laminated directly to display 204 using conventional techniques. Display 204 includes a first glass plate 206 and a display element 208. Display 204 may also include a second glass plate 210. First glass plate 206 provides rigidity to display 204 and provides protection for display element 208. Second glass plate 210 may provide additional rigidity and protection to display 204.

Figure 3:
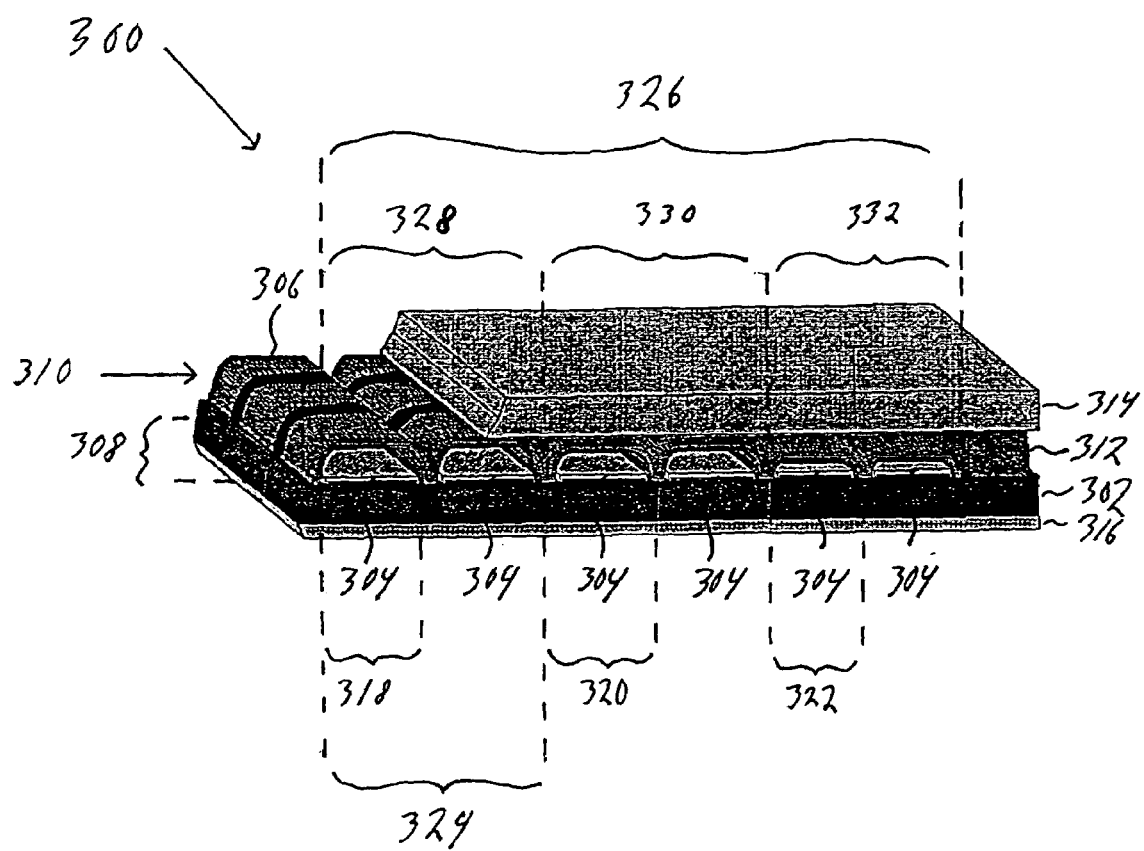
FIG. 3 illustrates one embodiment of an iMoD display.

Display element 208 may be an iMoD display, such as the iMoD display manufactured by Iridigm Display Corporation, located in San Francisco, Calif. 94107. The iMoD display is not pressure sensitive, and therefore the image produced by the iMoD display is not distorted when pressure is applied to its surface. FIG. 3 illustrates one embodiment of an iMoD display 300. iMoD display 300 includes a substrate 302 upon which one or more thin film stacks 304 are deposited. A metallic membrane 306 resides on substrate 302 such that each individual thin film stack 304, together with the portion of metallic membrane 306 covering the individual thin film stack 304, forms an iMoD 308. All of the iMoDs 308 in iMoD display 300 form an iMoD array 310. A seal 312 may be attached to substrate 302 so as to surround iMoD array 310. A packaging component 314 may be mounted on seal 312 such that packaging component 314 covers iMoD array 310. iMoD display 300 may also incorporate a front-surface element 316 or combination of front-surface elements, which may include diffuser films, gain films, front-lighting systems or other elements which serve enhance or modify the performance of iMoD display 300. iMoD array 310, in conjunction with substrate 302, seal 312, packaging component 314, and front-surface element 316 forms iMoD display 300.

The distance between thin film stack 304 and metallic membrane 306 in an iMoD 308 determines the color produced by the iMoD 314. The distance between thin film stack 304 and metallic membrane 306 is set during manufacturing to determine the color produced by the iMoD 308. iMoD array 310 may include iMoDs 308 having different distances between thin film stack 304 and metallic membrane 306, thus producing different colors. For example, an iMoD 318 having a first distance may produce red light, an iMoD 320 having a second distance may produce green light, and an iMoD 322 having a third distance may produce blue light. Multiple iMoDs 308 having the same distance, and therefore producing the same color, may form a sub-pixel 324. By including multiple iMoDs 308 within a single sub-pixel 324, the yield of iMoD display 300 can be increased. Furthermore, multiple sub-pixels 324 may form a pixel 326. Pixel 326 may include sub-pixels 324 having iMoDs 308 that produce different colors. For example, pixel 326 may include a sub-pixel 328 producing red light, a sub-pixel 330 producing green light, and a sub-pixel 332 producing blue light. Thus, iMoD display 300 can show a color image.

iMoD displays are described in further detail in U.S. Pat. No. 5,835,255, filed May 5, 1994; U.S. Pat. No. 5,986,796, filed Nov. 5, 1996; U.S. Pat. No. 6,040,937, filed Jul. 31, 1996; and, U.S. Pat. No. 6,055,090, filed Jan. 27, 1999. The disclosures of each of the aforementioned patents are herein incorporated by reference.

Figure 4:
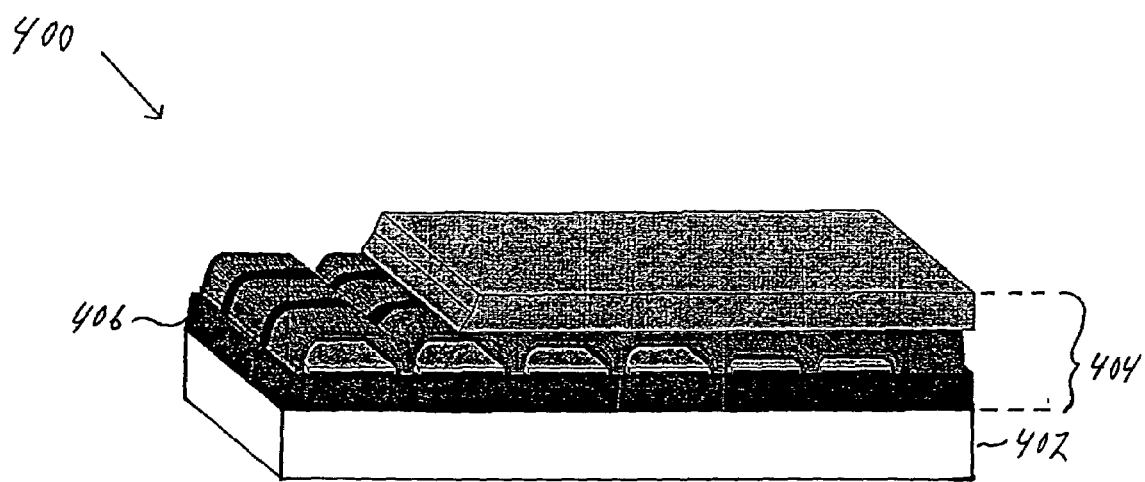
FIG. 4 illustrates one embodiment of a touch screen display having a touch screen directly mounted to an iMoD.
Figure 5:
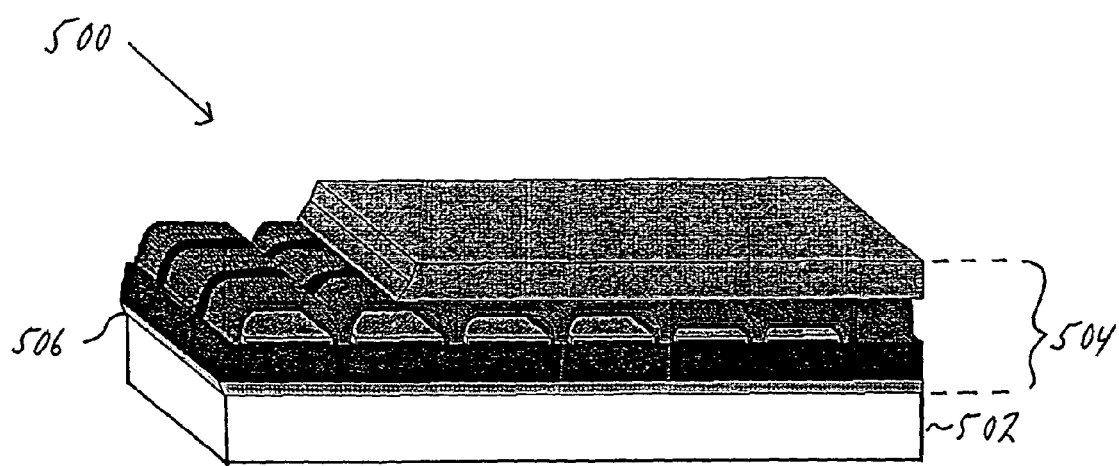
FIG. 5 illustrates another embodiment of a touch screen display having a touch screen directly mounted to an iMoD.
Figure 6:
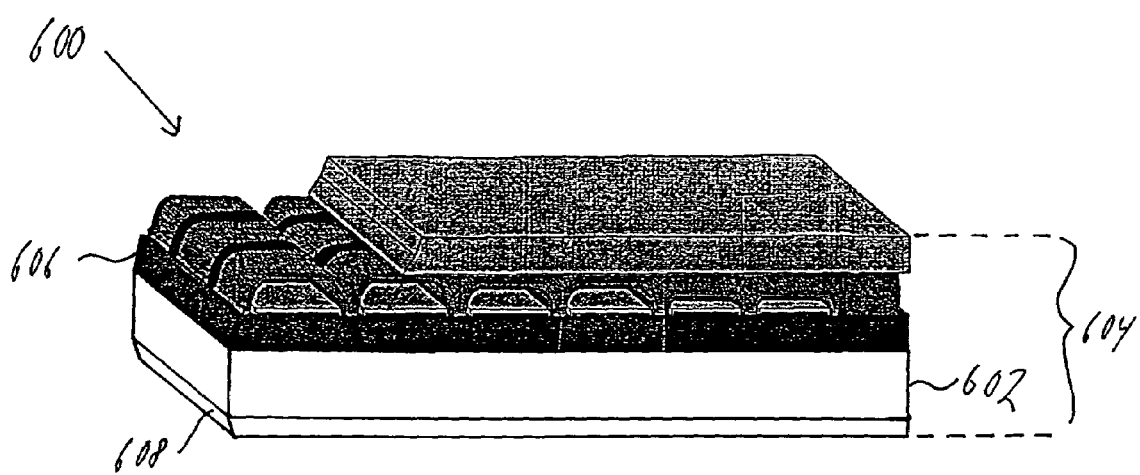
FIG. 6 illustrates another embodiment of a touch screen display having a touch screen directly mounted within an iMoD.

FIG. 4 illustrates one embodiment of a touch screen display 400 having a touch screen 402 directly mounted to an iMoD 404. Touch screen 402 is directly coupled to iMoD 404. In one embodiment, touch screen 402 is laminated directly to glass substrate 406. Touch screen 402 may be coupled directly to iMoD 404 because iMoD 404 is not sensitive to pressure. Thus, a user may apply pressure to touch screen 402 and iMoD 404 is not affected. In alternate embodiments, touch screen 402 is coupled to iMoD 404 using other conventionally known methods. FIG. 5 illustrates another embodiment of a touch screen display 500 having a touch screen 502 directly mounted to an iMoD 504. iMoD 504 includes a front-surface element 506 or combination of front-surface elements, which may include diffuser films, gain films, front-lighting systems or other elements which serve enhance or modify the performance of iMoD 504. Touch screen 502 is laminated directly to front-surface element 506. FIG. 6 illustrates another embodiment of a touch screen display 600 having a touch screen 602 directly mounted within an iMoD 604. Touch screen 602 is directly mounted to substrate 606, and front surface element 608 resides on touch screen 602. In alternative embodiments, touch screen 602 can reside anywhere in the layers of components that reside on substrate 606.

A touch screen may be directly coupled to any other type of display that is not sensitive to pressure. In one embodiment, the touch screen may be directly coupled to a light emitting polymer (LEP) display, such as the LEP display manufactured by Seiko Epson Corporation and Cambridge Display Technology, located in Seattle, Wash. 98101 and Cambridge, United Kingdom, respectively. In another embodiment, the touch screen may be coupled directly to an organic light emitting diode (OLED) display, such as the OLED display manufactured by Sanyo Electric Co. and Eastman Kodak Company, located in Compton, Calif. 90220 and Rochester, N.Y. 14650, respectively. In another embodiment, the touch screen may be directly coupled to an electronic ink display such as the eInK display manufactured by Gyricon Media Inc., located in Stamford, Conn. 06902. Touch screen displays including other types of displays that are not sensitive to pressure are intended to be include within the scope of the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A touch screen display comprising:
a touch screen; and
a pressure tolerant display including a plurality of interferometric modulator elements;
wherein the touch screen is directly coupled to the display; and
wherein the display comprises
a substrate having a first and second surface,
a film stack deposited on the first surface of the substrate, and
at least one metallic membrane forming an interferometric cavity with the film stack, wherein the distance between the metallic membrane and the film stack determines the color produced by each of the interferometric modulator elements.

2. The touch screen display of claim 1 wherein the touch screen is laminated to the display.

3. The touch screen display of claim 1 wherein the touch screen is a pressure sensitive touch screen.

4. The touch screen display of claim 3 wherein the display comprises:
a seal coupled to the first surface of the substrate; and
a packaging component coupled to the seal.

5. The touch screen display of claim 1 wherein the metallic membrane is coupled to the first surface of the substrate to cover the film stack.

6. The touch screen display of claim 1 wherein the touch screen is directly coupled to the second surface of the substrate.

7. The touch screen display of claim 1 wherein the display further comprises a front-surface element coupled to the second surface of the substrate.

8. The touch screen display of claim 7 wherein the touch screen is directly coupled to the front surface element.

* * * * *

UNITED STATES PATENT AND TRADEMARK OFFICE
CERTIFICATE OF CORRECTION

PATENT NO.        : 7,138,984 B1                                      Page 1 of 2
APPLICATION NO.   : 09/875401
DATED             : November 21, 2006
INVENTOR(S)       : Mark W. Miles It is certified that error appears in the above-identified patent and that said Letters Patent is hereby corrected as shown below:

On Page 4, in Column 1, under U.S. Patent Documents, line 15, delete "Adelman" and insert -- Adelmann --, therefor.

On Page 4, in Column 1, under Foreign Patent Documents, line 17, after "WO 03/073151" insert -- A1 --.

On Page 4, in Column 1, under Other Publications, line 16, delete "internet:" and insert -- Internet: --, therefor.

On Page 4, in Column 2, under Other Publications, line 21, delete "Microstructures" and insert -- Microstructure --, therefor.

On Page 4, in Column 2, under Other Publications, line 24, delete "date unknown." and insert -- (date unknown). --, therefor.

On Page 4, in Column 2, under Other Publications, line 49, delete "Capactiors" and insert -- Capacitors --, therefor.

On Page 5, in Column 1, under Other Publications, line 7, delete "Si02," and insert -- $SiO_2$ --, therefor.

UNITED STATES PATENT AND TRADEMARK OFFICE
CERTIFICATE OF CORRECTION

PATENT NO.        : 7,138,984 B1
APPLICATION NO. : 09/875401
DATED             : November 21, 2006
INVENTOR(S)      : Mark W. Miles It is certified that error appears in the above-identified patent and that said Letters Patent is hereby corrected as shown below:

On Page 5, in Column 1, under Other Publications, line 12, delete "Michromachining" and insert -- Micromachining --, therefor.

In column 6, line 2, in Claim 8, delete "front surface" and insert -- front-surface --, therefor.

Signed and Sealed this

Fifth Day of August, 2008

JON W. DUDAS
*Director of the United States Patent and Trademark Office*